June 21, 1927.
A. B. HENNINGER
1,633,209
STEERING GEAR FOR AUTOMOBILE VEHICLES
Filed April 28, 1926
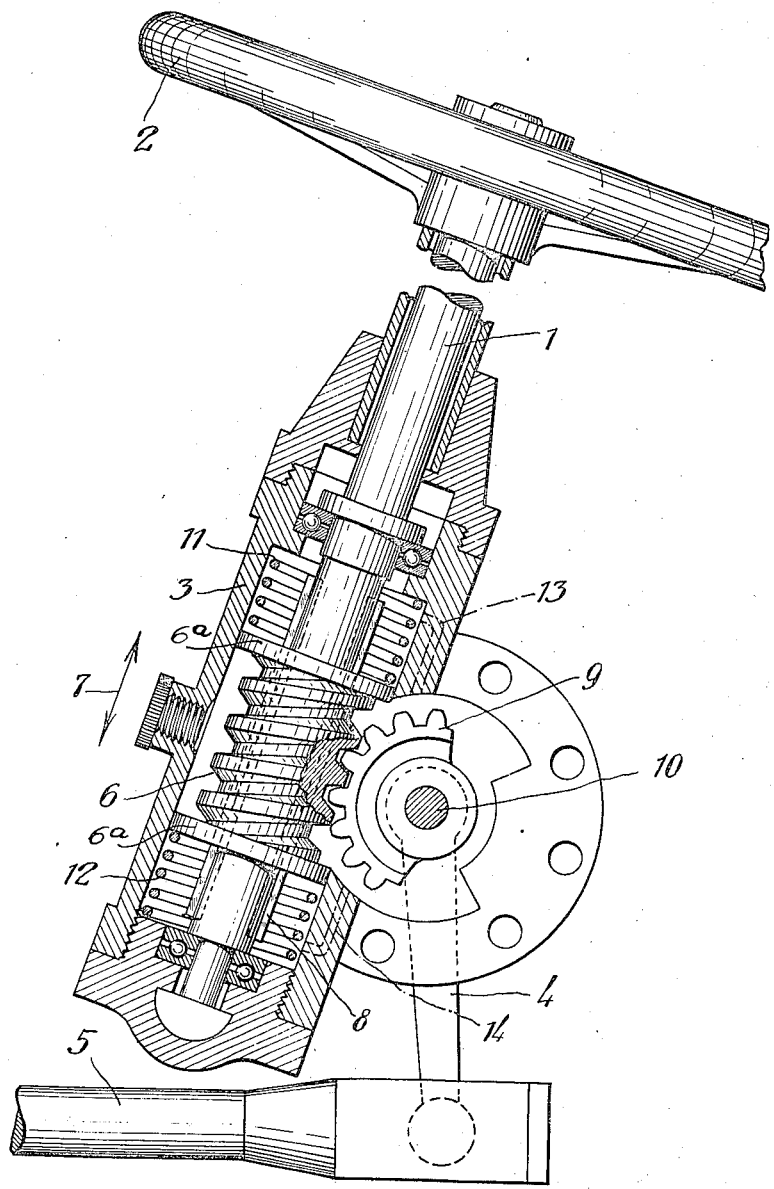
Inventor:
A. B. Henninger
By: Marks & Clerk
Attys Patented June 21, 1927.

1,633,209

UNITED STATES PATENT OFFICE.

ALBERT BERTHOLDT HENNINGER, OF BERLIN, GERMANY.

STEERING GEAR FOR AUTOMOBILE VEHICLES.

Application filed April 28, 1926, Serial No. 105,274, and in Germany March 21, 1922.

Steering devices for automobile vehicles are known in which the steering wheels of the vehicle are turned by a rotatable steering pillar through the medium of intermediate members and in which resilient elements are inserted in the said intermediate members, which are intended for the purpose of taking up and damping out the shocks to which the steering wheels are subject during the travel of the vehicle, so as not to let such shocks produce their full effect upon the steering column and, through it, upon the steering wheel, held by the person in charge of the vehicle. Such resilient members inserted in the connecting members between the steering pillar and the steering wheels have not proved satisfactory as in consequence of the special arrangement of the connecting members between the steering pillar and the steering wheels in an automobile vehicle, it was not possible to give to these resilient members the correct position and adequate dimensions for taking up effectively the shocks to which the steering wheels are subject and keeping them away from the steering wheel.

The invention overcomes these disadvantages by making the screw or worm member, which, by its rotation, by means of the steering pillar and of intermediate members such as a nut, a worm wheel, a steering lever and a thrust or impact rod, effects the turning of the steering wheels, slidable upon the steering pillar but rotatable therewith, and by providing means which act directly upon the said screw member and at this point take up and damp out the shocks to which the steering wheels are subject.

The invention is illustrated by way of example in the accompanying drawing in longitudinal section through the steering column.

In the accompanying drawing 1 denotes the steering column of an automobile vehicle, 2 the steering wheel for the driver of the vehicle, 3 a casing in which the steering pillar is journalled, 4 a steering lever which transmits the rotation of the steering pillar through a thrust rod 5 to the steering swivel of the steering wheels of the vehicle.

According to the invention a screw-threaded part 6 is so arranged upon the steering pillar 1 as to be slidable in the direction of the arrows 7; and by any suitable means, such as a non-circular formation of the steering pillar or by the use of a feather key 8, the rotation of the screw-threaded part is ensured when the steering pillar rotates. In the constructional example illustrated the threaded part 6 is constructed as a worm which engages in a worm wheel 9. This worm wheel is secured in a known manner to a pin 10 of the steering lever 4. Obviously a construction would also be possible in which the screw-threaded part 6 is constructed purely as a screw-threaded sleeve adapted to displace in its rotation a nut connected with the steering lever 4. Guiding discs 6ª are provided which guide the screw member 6 of the steering post in the casing 3 and prevent that the stresses and shocks which take effect vertical to the longitudinal direction of the steering post become effective on the bearing of this steering post.

Means such for example as helical springs 11 and 12 are provided which act directly upon the threaded part 6 and are preferably lodged in the casing 3 of the steering column and which effectually take up and damp out the shocks coming from the steering wheels through the intermediate members 5, 4 and 9 to the threaded part 6. After the threaded part has been displaced by a shock these springs immediately bring it back again into the normal position illustrated. If desired, the spaces for the springs 11 and 12 may also be filled with a liquid which assists the damping and for the equilibrium of which passages are provided such as are indicated in dot and dash lines at 13 and 14.

Owing to the apparatus according to the invention the driver's steering wheel is relieved of the shocks to which such steering wheels have hitherto been subject without the driver losing that consciousness of the degree of deflection of the steering wheels received by the sense of touch which is so necessary for the satisfactory steering of the vehicle. The danger of a breakage of the connecting members between the steering pillar and the steering wheels is considerably diminished. The wear of the screw threaded member 6 and of the part of the steering gear engaging therewith is also diminished. The lost motion that has hitherto quickly arisen in consequence of wear can no longer arise to such an extent, and on this ground special readjusting devices such as have hitherto been usual are no longer required. It is furthermore an important feature that the members which take up the shocks are so arranged as to be protected in the interior of the casing of the steering column.

By suitably dimensioning the springs 11 and 12 it is possible to prevent the so-called wabbling of the steering wheels which has hitherto been found to occur in known spring devices in the intermediate members, particularly when employing balloon tyres.

What I claim is:—

1. Steering gear for automobiles comprising, in combination, a steering pillar rotatable by the hand of the operator, a casing entirely surrounding the steering pillar, a cylindrical worm on said pillar and rotating with the latter and freely slidable to either side on the same in the casing, guiding discs at either side of said worm for guiding said worm with respect to the steering pillar in the casing, a transmission member in engagement with said worm adapted to transmit its movement caused by the turning of the steering pillar and of the worm upon the steering wheels of the motor vehicle, springs acting immediately with the inner ends upon said guiding discs and with the outer ends abutting against parts of the casing, adapted to damp the shocks which act on the steering wheels keeping the shocks from the steering post and its bearings and returning the freely slidable worm into its normal position after the displacement.

2. Steering gear for automobile vehicles, comprising in combination a steering pillar rotatable by hand by the person in charge of the vehicle, a screw-threaded member upon said steering pillar rotating with the steering pillar and slidable thereon, a transmission member engaging in said screw-threaded member and transmitting its motion produced by rotation of the steering pillar and of the screw-threaded member to the steering wheels of the vehicle, springs directly acting upon both ends of said screw-threaded member, damping out the shocks affecting the steering wheels and returning the screw-threaded member to its normal position after displacement, spaces for the springs constructed as fluid containers with corresponding outlets for a supplementary fluid damping.

In testimony whereof I have signed my name to this specification.

ALBERT BERTHOLDT HENNINGER.